US012335522B2

United States Patent
Tian et al.

(10) Patent No.: US 12,335,522 B2
(45) Date of Patent: Jun. 17, 2025

(54) VERTEX POSITION CODING IN MESH COMPRESSION

(71) Applicant: Tencent America LLC, Palo Alto, CA (US)

(72) Inventors: Jun Tian, Belle Mead, NJ (US); Chao Huang, Palo Alto, CA (US); Xiaozhong Xu, State College, PA (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 66 days.

(21) Appl. No.: 18/144,686

(22) Filed: May 8, 2023

(65) Prior Publication Data

US 2024/0015324 A1    Jan. 11, 2024

Related U.S. Application Data

(60) Provisional application No. 63/359,669, filed on Jul. 8, 2022.

(51) Int. Cl.
*H04N 19/597* (2014.01)
*H04N 19/105* (2014.01)
*H04N 19/17* (2014.01)

(52) U.S. Cl.
CPC ......... *H04N 19/597* (2014.11); *H04N 19/105* (2014.11); *H04N 19/17* (2014.11)

(58) Field of Classification Search
CPC .... H04N 19/597; H04N 19/105; H04N 19/17; H04N 19/593; H04N 19/119; H04N 19/198; H04N 19/70; H04N 19/91
See application file for complete search history.

(56) References Cited

U.S. PATENT DOCUMENTS

| | | | |
|---|---|---|---|
| 2018/0189982 A1 | 7/2018 | Laroche et al. | |
| 2021/0090301 A1* | 3/2021 | Mammou | G06T 7/11 |
| 2023/0082092 A1* | 3/2023 | Kang | H04N 19/60 |
| | | | 375/240.18 |

FOREIGN PATENT DOCUMENTS

| | | | | |
|---|---|---|---|---|
| EP | 4325853 A1 * | 2/2024 | | G06T 9/001 |
| GB | 2551389 A  * | 12/2017 | | G06T 9/001 |

(Continued)

OTHER PUBLICATIONS

Touma, Costa, and Craig Gotsman. "Triangle mesh compression." Proceedings-Graphics Interface. Canadian Information Processing Society, 1998, pp. 1-9.

(Continued)

*Primary Examiner* — Tracy Y. Li
(74) *Attorney, Agent, or Firm* — ArentFox Schiff LLP

(57) ABSTRACT

In a method, a plurality of candidate predictions of a current vertex is determined. The current vertex is included in a plurality of vertices of a mesh. The plurality of candidate predictions is determined based on a plurality of triangles in the mesh. Each of the plurality of predictions corresponds to a respective candidate prediction. A prediction of the current vertex is determined from the plurality of candidate predictions. The prediction is identified by a prediction index that is predetermined based on a number of the plurality of candidate predictions of the current vertex being equal to or larger than a threshold value. Prediction information of the current vertex is encoded based on the determined prediction. The prediction information includes the prediction index identifying the prediction of the current vertex.

20 Claims, 9 Drawing Sheets

(56) References Cited

FOREIGN PATENT DOCUMENTS

| KR | 20030073100 A | * | 9/2003 | ............. | G06T 9/008 |
| WO | WO-2020123252 A1 | * | 6/2020 | ............. | G06T 17/20 |
| WO | WO-2022225333 A1 | * | 10/2022 | ............. | G06T 9/001 |

OTHER PUBLICATIONS

Maglo, Adrien, et al. "3d mesh compression: Survey, comparisons, and emerging trends." ACM Computing Surveys (CSUR) 47.3 (2015): 1-41.
A. S. Jarek Rossignac and A. Szymczak. "3d compression made simple: Edgebreaker on a corner table". In Proceedings of Shape Modeling International Conference, Genoa, Italy, 2001, pp. 1-7.
International Search Report with Written Opinion issued in Application No. PCT/US2023/067051, mailed Sep. 26, 2023, 11 pages.

* cited by examiner

VERTEX POSITION CODING IN MESH COMPRESSION

INCORPORATION BY REFERENCE

The present application claims the benefit of priority to U.S. Provisional Application No. 63/359,669, "Vertex Position Coding in Mesh Compression" filed on Jul. 8, 2022, which is incorporated by reference herein in its entirety.

TECHNICAL FIELD

The present disclosure includes embodiments related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Advances in three-dimensional (3D) capture, modeling, and rendering have promoted ubiquitous presence of 3D content across various platforms and devices. Nowadays, it is possible to capture a baby's first step in one continent and allow grandparents of the baby to see (and in some cases interact) and enjoy a full immersive experience with the child in another continent. In order to achieve such realism, models are becoming ever more sophisticated, and a significant amount of data is linked to the creation and consumption of those models. 3D meshes are widely used to represent such immersive contents.

SUMMARY

Aspects of the disclosure provide methods and apparatuses for mesh processing. In some examples, an apparatus for mesh processing includes processing circuitry.

According to an aspect of the disclosure, a method of mesh processing performed in a video encoder is provided. In the method, a plurality of candidate predictions of a current vertex is determined. The current vertex is included in a plurality of vertices of a mesh. The plurality of candidate predictions is determined based on a plurality of triangles. Each of the plurality of triangles corresponds to a respective candidate prediction. A prediction of the current vertex is determined from the plurality of candidate predictions. The prediction is identified by a prediction index that is predetermined based on a number of the plurality of candidate predictions of the current vertex being equal to or larger than a threshold value. Prediction information of the current vertex is encoded based on the determined prediction. The prediction information includes the prediction index identifying the prediction of the current vertex.

In some embodiments, the threshold value is equal to or larger than 2 and equal to or smaller than 5.

In an example, to determine the plurality of candidate predictions of the current vertex, a first triangle of the plurality of triangles is determined for the current vertex, where the first triangle shares an edge with a second triangle of the plurality of triangles. The current vertex is included in the second triangle and opposite to the shared edge. A first candidate prediction of the plurality of candidate predictions is determined based on the determined first triangle via a parallelogram prediction in which the first candidate prediction and the first triangle form a first parallelogram.

In an example, to determine the plurality of candidate predictions of the current vertex, an average prediction of the plurality of candidate predictions is determined.

In an example, to determine the prediction of the current vertex, a prediction list is determined for the current vertex. Candidate predictors of the prediction list include the average prediction and the plurality of candidate predictions subsequent to the average prediction in the prediction list. An order of the plurality of candidate predictions in the prediction list is based on an order of the plurality of triangles corresponding to the plurality of candidate predictions. Each of the candidate predictors in the prediction list is associated with a respective prediction index.

In some embodiments, the plurality of triangles is ordered based on an Edgebreaker algorithm in which the plurality of triangles is labelled in a spiraling triangle-spanning-tree order.

In an example, based on the prediction index being predetermined as a first prediction index in response to the number of the plurality of candidate predictions of the current vertex being equal to the threshold value, the prediction of the current vertex is determined as a first one of the candidate predictors in the prediction list according to the predetermined prediction index. In an example, based on the prediction index being predetermined as a second prediction index in response to the number of the plurality of candidate predictions of the current vertex being larger than the threshold value, the prediction of the current vertex is determined as a second one of the candidate predictors in the prediction list according to the predetermined prediction index. In an example, based on the prediction index being predetermined as a third prediction index in response to the number of the plurality of candidate predictions of the current vertex being equal to or larger than the threshold value, the prediction of the current vertex is determined as a third one of the candidate predictors in the prediction list according to the predetermined prediction index.

In an example, to determine the prediction of the current vertex, a prediction difference between each of the candidate predictors in the prediction list and the current vertex is determined. The prediction is further determined from the candidate predictors in the prediction list that corresponds to a minimum prediction difference of the prediction differences.

In an example, to determine the prediction of the current vertex, the prediction is determined in a subset of the candidate predictors of the prediction list that has a minimum prediction difference.

In some embodiments, the respective prediction index is determined for each of the candidate predictors in the prediction list based on one of a fixed length coding, a variable length coding, and a differential coding.

In some embodiments, the prediction information of the current vertex includes residual information. The residual information indicates a difference between the current vertex and the determined prediction. In some embodiments, the residual information can be encoded. For example, the residual information can be encoded based on one of a fixed length coding, an exponential-Golomb coding, and arithmetic coding.

According to another aspect of the disclosure, an apparatus is provided. The apparatus includes processing circuitry. The processing circuitry can be configured to perform any of the described methods for mesh processing.

Aspects of the disclosure also provide a non-transitory computer-readable medium storing instructions which when executed by a computer cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
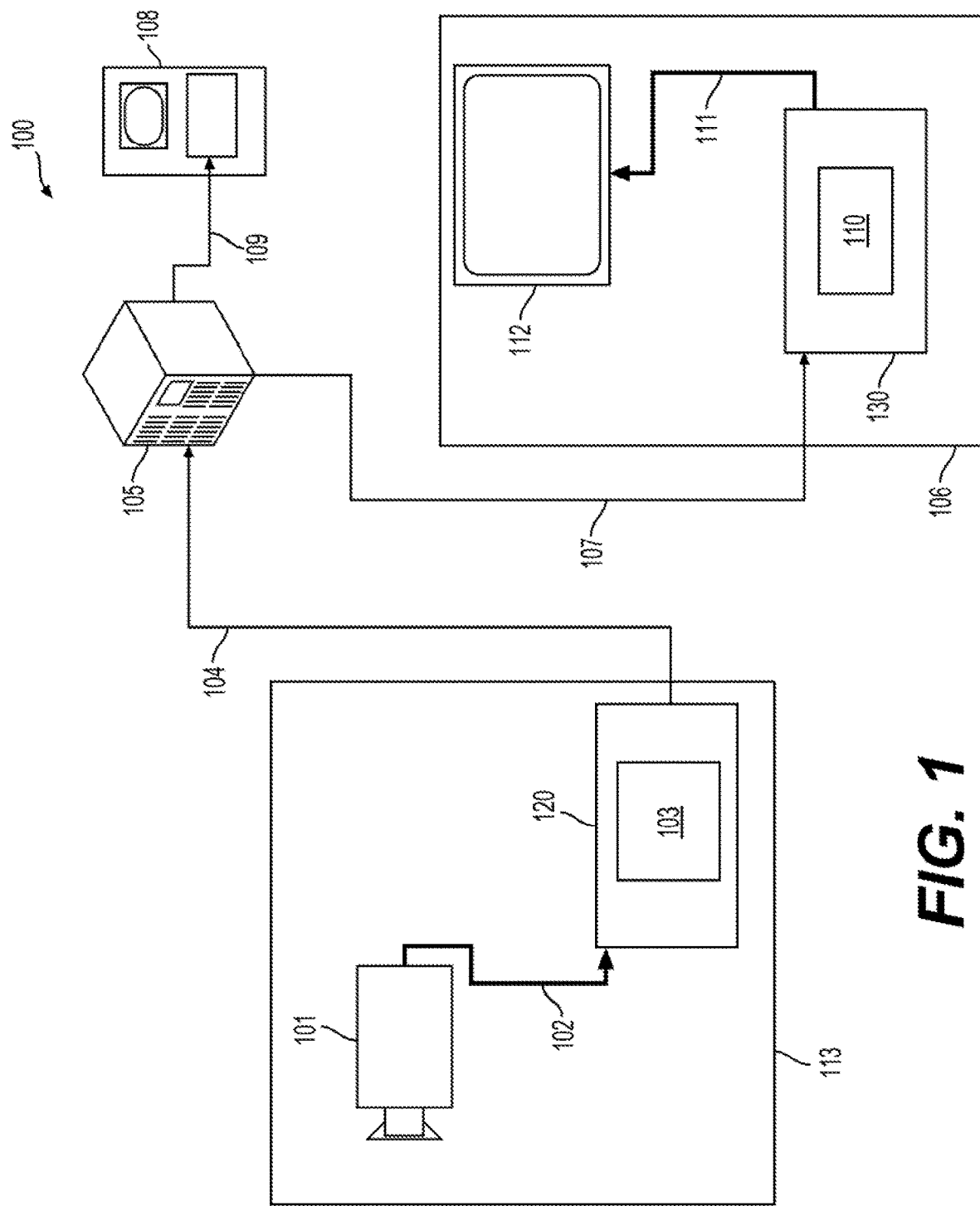
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other image and video enabled applications, including, for example, video conferencing, digital TV, streaming services, storing of compressed video on digital media including CD, DVD, memory stick and the like.

The video processing system (100) includes a capture subsystem (113), that can include a video source (101). The video source (101) can include one or more images captured by a camera and/or generated by a computer. For example a digital camera creates a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
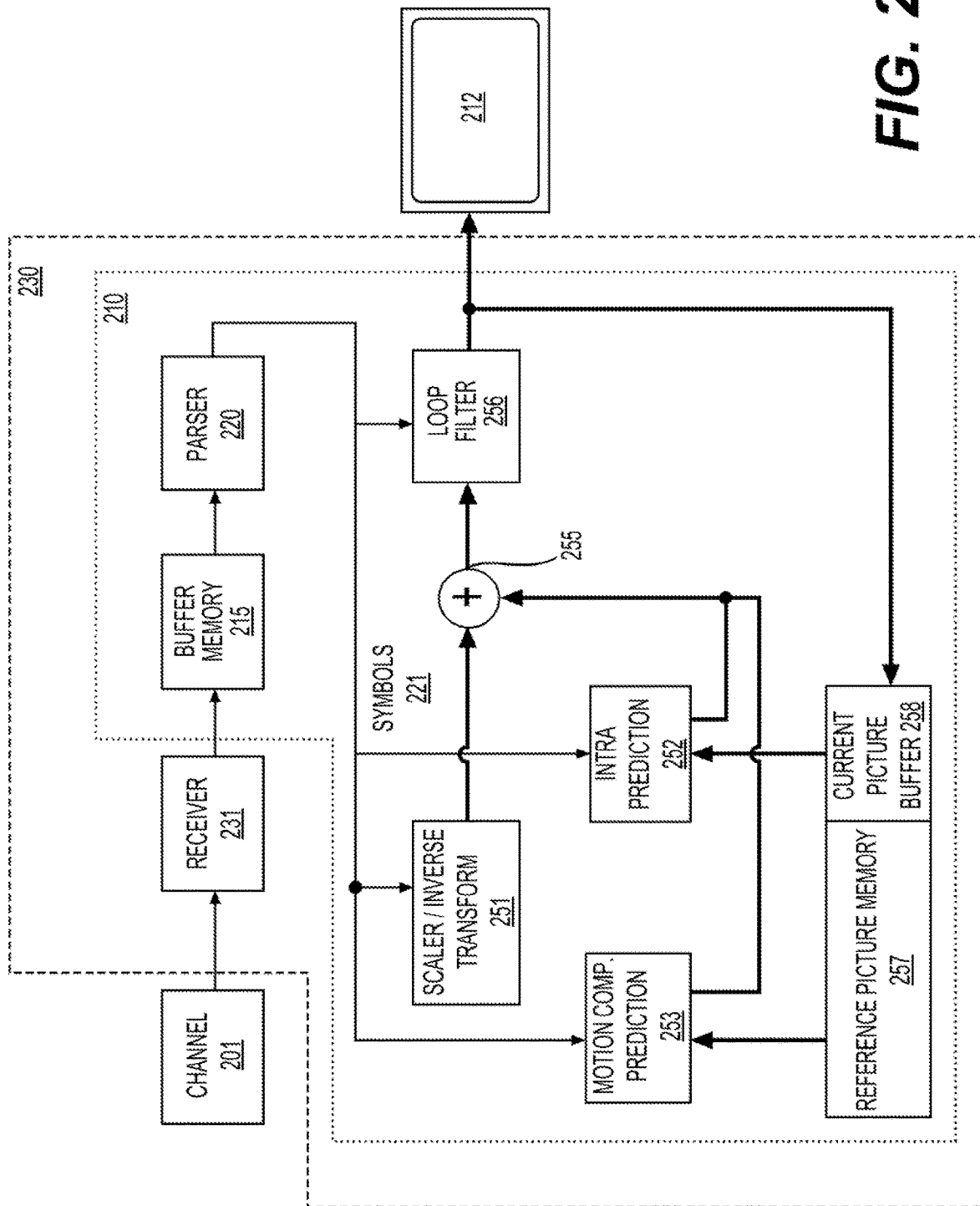
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231). The receiver (231) may include receiving circuitry, such as network interface circuitry. The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc., as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
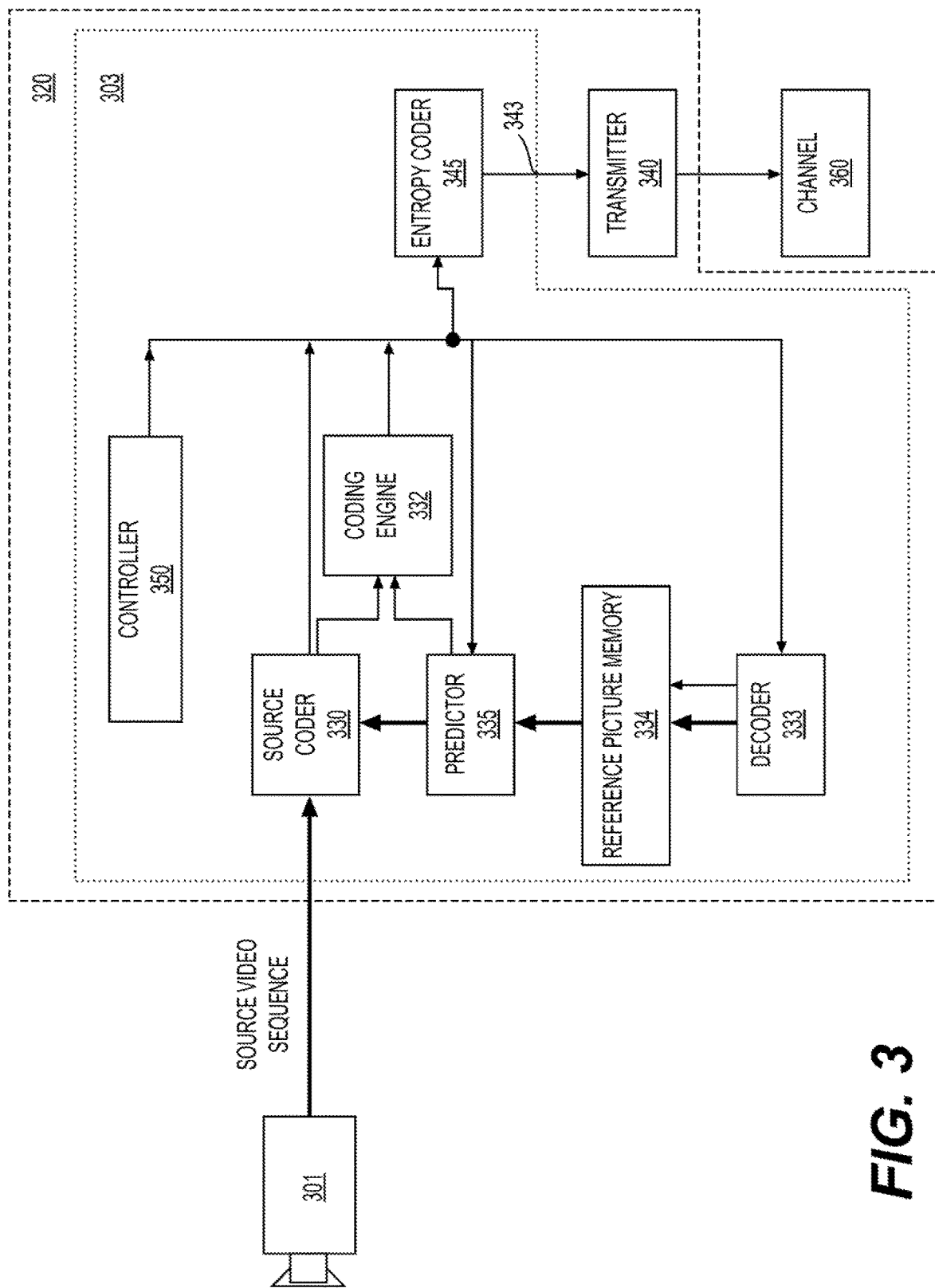
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc., in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, etc.), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create.

The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

The disclosure includes embodiments related to methods and systems of a vertex position coding in a mesh compression.

A mesh can include several polygons that describe a surface of a volumetric object. Each polygon of the mesh can be defined by vertices of the corresponding polygon in a three-dimensional (3D) space and information of how the vertices are connected, which can be referred to as connectivity information. In some embodiments, vertex attributes, such as colors, normals, etc., can be associated with the mesh vertices. Attributes (or vertex attributes) can also be associated with the surface of the mesh by exploiting mapping information that parameterizes the mesh with two-dimensional (2D) attribute maps. Such mapping can usually be described by a set of parametric coordinates, referred to as UV coordinates or texture coordinates, associated with the mesh vertices. 2D attribute maps can be used to store high resolution attribute information such as texture, normals, displacements etc. Such information can be used for various purposes such as texture mapping and shading.

A dynamic mesh sequence may require a large amount of data since the dynamic mesh can include a significant amount of information changing over time. Therefore, efficient compression technologies are required to store and transmit such contents. Mesh compression standards, such as IC, MESHGRID, and FAMC, were previously developed by MPEG to address dynamic meshes with a constant connectivity, a time varying geometry, and vertex attributes. However, these standards may not consider time varying attribute maps and connectivity information. DCC (Digital Content Creation) tools usually generate such dynamic meshes. However, it can be challenging for volumetric acquisition techniques to generate a constant connectivity dynamic mesh, especially under real time constraints. This type of content (e.g., a constant connectivity dynamic mesh) may not be supported by existing standards. MPEG is planning to develop a new mesh compression standard to directly handle dynamic meshes with time varying connectivity information and optionally time varying attribute maps. The new mesh compression standard targets lossy and lossless compression for various applications, such as real-time communications, a storage, a free viewpoint video, Augmented Reality (AR), and Virtual Reality (VR). Functionalities, such as a random access and a scalable/progressive coding, can also be considered.

Mesh geometry information can include vertex connectivity information, 3D coordinates, and 2D texture coordinates, etc. Compression of vertex 3D coordinates, which may also be referred to as vertex positions, can be very important because, in many cases, compression of the vertex 3D coordinates can consume a significant portion of the entire geometry related data.

In the disclosure, for simplicity and clarity, embodiments are described using triangle meshes as an example. However, other polygonal meshes (e.g., quadrilateral or pentagon meshes) can also be applied to embodiments in the disclosure. In an example, a triangle mesh is a type of a polygon mesh that includes a set of triangles. The set of triangles can be connected by common edges or corners of the set of triangles. The common edges or corners can be denoted as mesh vertices.

Figure 4B:
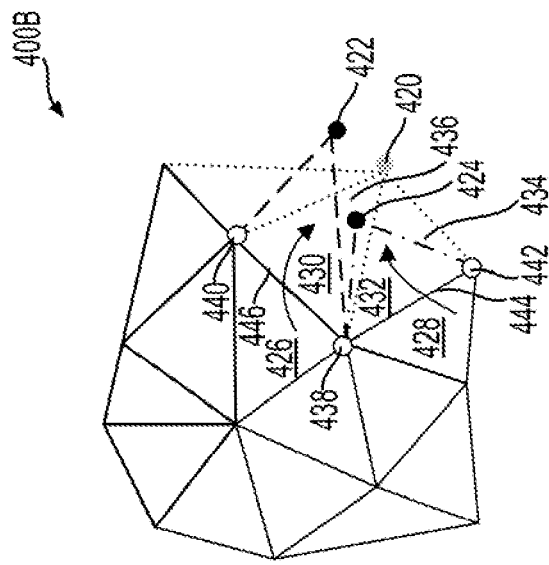
FIG. 4B is a schematic illustration of a second exemplary Parallelogram prediction according to some embodiments of the disclosure.
Figure 4A:
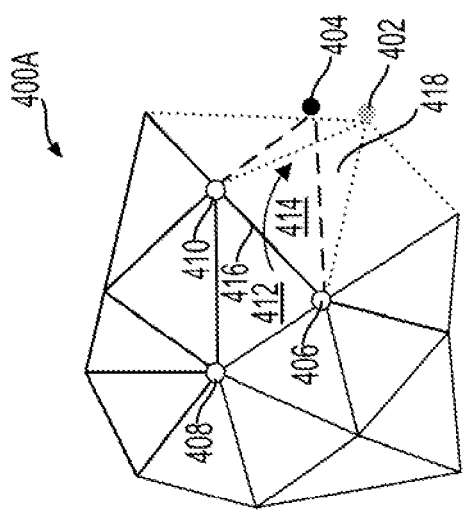
FIG. 4A is a schematic illustration of a first exemplary Parallelogram prediction according to some embodiments of the disclosure.

Vertex position compression can be implemented by a parallelogram prediction. In the parallelogram prediction, a compression algorithm can introduce a new vertex that is included in a prediction triangle. The prediction triangle can be formed based on an edge that is shared with an adjacent triangle. In an example, the adjacent triangle can be previously coded. The new vertex can indicate a predicted position of a current vertex. The new vertex can form a parallelogram with three vertices included in the adjacent triangle. For example, as shown in FIG. 4A, a mesh (400A) can include a plurality of triangles, such as triangle (412). Each of the triangles can include three vertices. For example, the triangle (412) can include vertices (406), (408), and (410). To code a current vertex (402), according to the parallelogram prediction, a prediction vertex (or a prediction) (404) for the current vertex (402) can be generated based on a prediction triangle (414). The prediction vertex (404) can be included in the prediction triangle (414). The prediction triangle (414) can share the edge (416) with the triangle (412). The vertices (406), (408), (410), and the prediction vertex (404) can form a parallelogram. Further the current vertex (402) can be included in a triangle (418) of the mesh (400A), where the triangle (418) and the triangle (412) share the edge (416).

A multi-parallelogram prediction can be applied to predict a current vertex. The multi-parallelogram prediction can use an average position given by two or more parallelogram predictions, for example whenever they are available. FIG. 4B provides an example of two-parallelogram predictions. As shown in FIG. 4B, a current vertex (420) can be included in a first triangle (434) of a mesh (400B). The first triangle (434) can include vertices ((420), (438), and (442)). The first triangle (434) can share an edge (444) with an adjacent triangle (428) of the mesh (400B). The current vertex (420) can also be included in a second triangle (436) that includes the vertices (420), (438), and (440). The second triangle (436) can share an edge (446) with an adjacent triangle (426) of the mesh (400B). Based on the shared edge (444), a first prediction vertex (or a first prediction) (424) can be determined. The first prediction vertex (424) can form a first parallelogram with the adjacent triangle (428). Based on the shared edge (446), a second prediction vertex (or a second prediction) (422) can be determined. The second prediction vertex (422) can form a second parallelogram with the adjacent triangle (426). Thus, the current vertex (420) can further be predicted by an average of the first prediction vertex (424) and the second prediction vertex (422).

In the disclosure, methods and/or systems of a vertex position coding for a mesh compression are provided. In an embodiment, based on a parallelogram prediction, a predicted position value (or a prediction or a prediction vertex) of a current vertex can be selected from a plurality of candidate position values (or candidate predictions or candidate prediction vertices). The selected prediction vertex can be coded (or identified) by an index. A prediction residue between the selected prediction vertex and the current vertex can further be coded.

In the disclosure, a number of methods and/or systems can be proposed for vertex position prediction in a mesh compression. It should be noted that the methods and/or systems can be applied individually or by any form of combinations. It should be also noted that the methods can be applied to not only dynamic meshes, but also static meshes. A static mesh may only include one frame or a mesh content of the static mesh may not change over time. Further, the disclosed methods and/or systems are not limited to a vertex position prediction. The disclosed methods and/or can also be applied to, for example, a 2D texture coordinate prediction, or a more general multi-prediction based scheme.

Triangles in a triangle mesh (or mesh) can be ordered. An order of the triangles in the mesh can be a traversed according to an Edgebreaker algorithm or other partition algorithms. Further, in an example, vertices in the mesh can also be ordered based on the order of the triangles. In an example, orders or a traversal order of triangles and vertices can be determined based on a same scheme or different schemes.

Figure 5B:
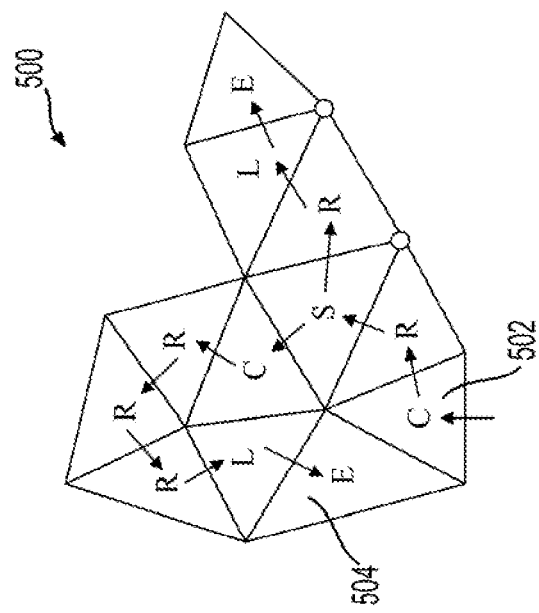
FIG. 5B shows an exemplary mesh traversal according to an Edgebreaker algorithm.
Figure 5A:
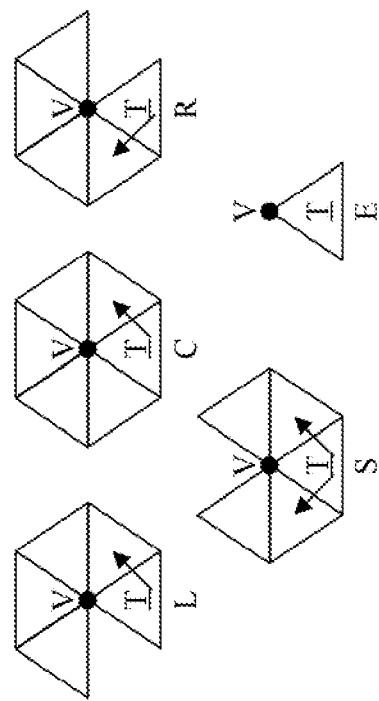
FIG. 5A shows an example of five patch configurations of an Edgebreaker algorithm.

FIGS. 5A and 5B show an exemplary ordering of triangles and vertices in a mesh based on the Edgebreaker algorithm. FIG. 5A shows five exemplary patch configurations of the Edgebreaker algorithm. As shown in FIG. 5A, v is a patch center vertex and T is a current triangle. An active gate (or current triangle) in each patch can be denoted as T. In patch C, a complete triangle that fans (or rotates) around v can be provided. In patch L, one or more missing triangles can be positioned to the left of the active gate T. In patch R, one or missing triangles can be positioned to the right of the active gate T. In patch E, v is only adjacent to T. In patch S, one or more missing triangles can be positioned at positions other than to the left or right of the active gate T. FIG. 5B shows an exemplary traversal of a mesh (500) in which triangles of the mesh (500) can be ordered based on the traversal of the Edgebreaker algorithm. As shown in FIG. 5B, the triangles in the mesh (500) can be traversed along a spiraling triangle-spanning-tree. For example, the traversal can start with a triangle (502) of the type C (or patch C). The traversal can then proceed along a branch adjacent to a right edge of the triangle (e.g., (502)). The traversal can stop when a triangle of the type E (e.g., (504)) is reached. According to the Edgebreaker algorithm, the triangles of the mesh (500) can be traversed (or ordered) in a sequence of CRSRLE-CRRRLE, which can be show in FIG. 5B. Vertices in each triangle of the mesh (500) can also be ordered based the order of the triangles.

Figure 6:
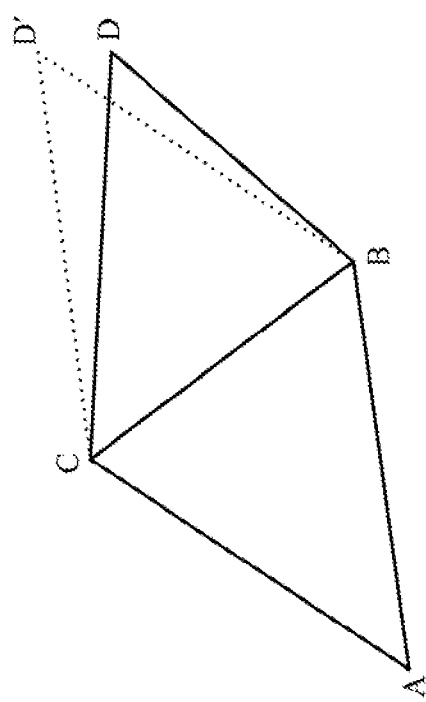
FIG. 6 is a schematic illustration of an example of predicting a vertex based on a Parallelogram prediction.

In a triangle mesh, each triangle, which can also be called a face, has three vertices. For two triangles that share an edge, a parallelogram prediction can be applied to use one of two opposite vertices in the two triangles as a predictor for another one. As shown in FIG. 6, two triangles ABC and DBC can share an edge BC. Coordinates of vertices A, B, and C, which are already coded, can be applied to predict coordinates of D. For example, a prediction vertex (or a prediction) D' can be determined based on the parallelogram prediction. Coordinates of the prediction vertex D' can be determined in equation (1) as follows:

$$D'=B+C-A \qquad \text{Eq. (1)}$$

In this way, four vertices (D', B, A, C) can form a parallelogram as shown in FIG. 6. As each vertex has 3D coordinates, equation (1) can be used to compute each coordinate component of the prediction vertex D'. For example, assume subscripts x, y, z denoting 3D coordinates in a xyz space, coordinate components of the prediction vertex D' in the xyz space can be provided in equations (2)-(4):

$$D_x'=B_x+C_x-A_x \qquad \text{Eq. (2)}$$

$$D_y'=B_y+C_y-A_y \qquad \text{Eq. (3)}$$

$$D_z'=B_z+C_z-A_z \qquad \text{Eq. (4)}$$

Triangle ABC can be denoted as a prediction candidate (or prediction triangle) of the vertex D, if the position values of vertices A, B, and C have been coded and can be used for prediction. A vertex could have zero, one, two, or more prediction candidates, depending on the number of existing coded vertices and shared edges. If there is more than one prediction candidate for a current vertex, the prediction candidates can be ordered, based on a triangle order of the mesh. For example, the triangles can be ordered based on the Edgebreaker algorithm or the like.

In the disclosure, a plurality of predictions (or parallelogram predictions) of a current vertex can be determined. An average (or an average prediction) of the plurality of parallelogram predictions can be further determined. A prediction (or a prediction vertex) of the current vertex can be selected from a prediction list. Predictors (or candidate predictors) of the prediction list can include, for example, the available parallelogram predictions and the average of the multiple parallelogram predictions. An associated prediction error, which can also be referred to as a prediction residue, can be coded. The prediction error (or prediction residue) can indicate a difference between the prediction and the current vertex. In an embodiment, the prediction can correspond to a minimum prediction error between the current vertex and each of the predictors (or candidate predictors) in the prediction list. In an embodiment, based on a number of the predictors (or candidate predictors) in the prediction list being equal to or larger than a threshold value, the prediction can be predefined in the prediction list. Thus, according to the number of the predictors (or candidate predictors) in the prediction list being equal to or larger than the threshold value, a specific (or predetermined) predictor in the prediction list can be selected as the prediction for the current vertex.

In the disclosure, all triangles in a triangle mesh can be ordered. For example, the triangles can be ordered based on Edgebreaker algorithm. In addition, all or a subset of vertices in the triangle mesh can also be ordered. In an example, the vertices can be ordered based on an order of the triangles.

Given a vertex V in a triangle mesh, and the vertex V including N prediction candidates (or prediction triangles). The N prediction candidates can produce N predicted values, $V_1'$, $V_2'$, . . . , $V_N'$. For example, as shown in FIG. 4B, the current vertex (420) can have two prediction triangles (430) and (432). Each of the prediction triangles (430) and (432) can produce a respective prediction value (or prediction vertex), such as (422) and (424) respectively. The prediction values of the current vertex can be ordered based on an order of the corresponding prediction triangles in the mesh. If duplicates are determined in predicted values, such duplicates can be removed from the list of prediction values.

In an example, if N=0, no prediction candidate is available for the vertex V. If V is a first vertex to be coded in a mesh, a prediction value V' of the first vertex can be set as 0, and a prediction residue R can be set as V. Thus, V'=0, R=V. If V is not the first vertex to be coded, the prediction value V' of V can be set as a coded value of a previously coded vertex in the vertex order. Thus, the previously coded vertex can be the predictor of the vertex V. The prediction residue R can be determined as a difference between the vertex V and the prediction value (or prediction vertex) V', R=V−V'.

In an example, if N=1, only one prediction candidate is available for the vertex V. Accordingly, the prediction value V' can be determined based on the only prediction candidate, and the prediction residue R can be determined as a difference between the V and V', R=V−V'.

In an example, if N>=2, more than one prediction candidate are available for the vertex V. Thus, a plurality of prediction values (or prediction vertices) can be determined based on the more than one prediction candidate. In an embodiment, an average of the prediction values can be regarded as an additional predictor $V_0'$. The $V_0'$ can be determined in equation (5):

$$V_0'=(V_1'\pm V_2'+\ldots+V_N')/N \qquad \text{Eq. (5)}$$

If the average prediction value $V_0'$ is equal to one of the prediction values $V_1'$, $V_2'$, $V_N'$, either the average prediction value $V_0'$ or the duplicated prediction value can be removed.

In an embodiment, at an encoder side, $V_i'$ can be compared with V, where 0<=i<=N. A prediction index j can be selected. The selected prediction index j indicates a selected prediction value among $V_i'$ that corresponds to a minimum prediction residue between V and each of the prediction values $V_i'$. In some embodiments, the minimization error (or minimum prediction residue) can be measured by $L^0$ norm, $L^1$ norm, $L^2$ norm, or some other norm. For example, the $L^0$ norm can be determined in equation (6) as follows:

$$L^0 \text{ norm}=\sqrt{(V_{0x}'-V_x)^2+(V_{0y}'-V_y)^2+(V_{0z}'-V_z)^2} \qquad \text{Eq. (6)}$$

where $V_x$, $V_y$, and $V_z$ are coordinates of V in a xyz space, and $V_{0x}'$, $V_{0y}'$, and $V_{0z}'$ are coordinates of $V_0'$ in the xyz space.

At a decoder side, the index of the selection (e.g., the prediction index) can be decoded and the selected predictor (or prediction value) can be recovered from a list of predictors (or candidate predictors). For example, the decoder can determine one or more prediction values for the current vertex based on a prediction mode, such as the parallelogram prediction. In addition, an average of the plurality of prediction values can be considered as a predictor. The average prediction value and the one or more prediction values can be ordered to form a prediction list. In an example, the prediction list generated in the decoder side can be the same as the prediction list generated in the encoder side. According to the decoded prediction index, the selected predictor can be recovered based on the prediction index from the prediction list.

In an embodiment, at the encoder side, if N is equal to some specified values (e.g., 2<=N<=5), a fixed prediction index (e.g., one of indices 0, 1, N) can be selected in the prediction list. The fixed prediction index indicates a predetermined predictor (or prediction vertex) for the current vertex. Accordingly, the prediction index may not be coded. At the decoder side, the decode can first construct the prediction list. The decoder then can recover (or determine) the predictor according to the fixed prediction index. In an example, if N>2, a prediction index 0 can be selected, which can indicate the average of the plurality of predictions. In an example, if N>2, the prediction index may not be coded.

In an embodiment, at the encoder side, if N is equal to or larger than a specific value (or threshold value), a fixed prediction index can be selected or determined. In an example, the specific value (or threshold value) can be 2. In an example, the threshold value (or specific value) can be between 2 and 10. Accordingly, all prediction indices in the prediction list may not be coded. At the decoder side, the decode can recover (or determine) the prediction index based on the number of N. For example, for N=2, a prediction index 1 can be selected. For N>2, a prediction index 0 can be selected. In another example, for N>=2, the prediction index 0 can be selected.

In an embodiment, an upper limit, M, can be set. The upper limit M can indicate how many prediction candidates can be considered (or applied) in the prediction list. In a case, if N>M, then for each vertex in a mesh, only the first M prediction candidates are considered. Accordingly, predicted values associated with the first M prediction candidates, $V_1'$, $V_2'$, ..., $V_M'$ are applied. In an embodiment, an average of the first M prediction values can be determined in equation (7):

$$V_0'=(V_1'+V_2'V_M')/M \qquad \text{Eq. (7)}$$

M can be an integer, such as 4. Thus, up to M (e.g., 4) prediction candidates can be considered. Note that the average prediction $V_0'$ can be put in different positions in the candidate list. In an example, the average prediction $V_0'$ can be a first predictor in the prediction candidate list. In an example, the average prediction $V_0'$ can be a last predictor in the prediction candidate list. In an example, the average prediction $V_0'$ can be positioned in the prediction values $V_1'$, $V_2'$, ..., $V_M'$.

For a vertex V with N prediction candidates $V_1'$, $V_2'$, ..., $V_N'$, and the average $V_0'$, the selected prediction index may be coded.

In some embodiment, the prediction index needs to be coded only if more than one prediction candidate exist. For example, when two or more prediction candidates are available for a current vertex, an index indicating a selected prediction candidate can be coded in an encoder side. In a decoder side, the decoder can determine the two or more prediction candidates with a same order as the encoders. The decoder can decode the coded prediction index and reconstruct the selected prediction candidate based on the prediction index from the two or more prediction candidates.

In an embodiment, if no prediction candidate is determined, or only one prediction candidate is determined, the prediction index may not be required to be coded. Therefore, the prediction value can be the current vertex itself or the only prediction candidate. In an embodiment, the prediction index can always be coded regardless how many predictor candidates are available. When no predictor is available, the value of the signaled index may not affect a decoding process in the decoder side.

In some embodiments, when a fixed prediction index is always selected, or predetermined, for some specified values of N, then the prediction index may not need to be coded. Therefore, the prediction indices for the predictors (or candidate predictors) in the candidate list may not need to be coded, the selected prediction index from the candidate list may not be signaled to the decoder.

In some embodiments, the prediction index may not be fixed and can be selected from prediction candidates. When more than one prediction candidates are determined for a current vertex, the prediction index can be coded, such as using a fixed length coding. For example, if 3 prediction candidates are determined for the current vertex, then 4 possible prediction indices, 0, 1, 2, and 3 (0: indicates an average value of candidates 1, 2, and 3) can be required. Thus, a two-digit binary number can be applied to represent each of the four prediction indices. It should be noted that different vertices of a triangle mesh could use different fixed lengths. For example, if another vertex has 7 prediction candidates, then the other vertex can use a three-digit binary number for a prediction index representation. An output from the fixed length coding can be further compressed by an entropy coding, such as arithmetic coding.

Alternatively, the prediction index can be coded using a variable length coding. For example, if 4 prediction candidates are determined for a current vertex, then 5 possible prediction indices, 0, 1, 2, 3, and 4 can be required. A variable length code of 0, 100, 101, 110, and 111 can be assigned to represent the 5 prediction indices 0, 1, 2, 3, and 4, respectively. Alternatively, a variable length code of 1, 01, 001, 0001, and 00001 can be applied to represent 5 prediction indices of 0, 1, 2, 3, and 4, respectively. Note that different vertices of a triangle mesh could use different variable lengths. An output from the variable length coding can be further compressed by an entropy coding, such as arithmetic coding.

Alternatively, the prediction index can be differential coded, where the prediction index of the current vertex can be predicted from previously coded prediction indices, and the prediction error associated with the prediction index can also be coded. For example, a difference between a first prediction index of the predictors and a second prediction index of the predictors can be coded at first. The second prediction index can further be coded based on the difference between the first prediction index and the second prediction index.

When an upper limit M is set to limit a maximum number of prediction candidates, and if more than M prediction candidates are available for a vertex V, then only the first M prediction candidates may be used to predict the vertex V. Thus, (M+1) possible prediction indices can be coded, where M indicates the first M prediction candidates and 1 indicates an average of the first M prediction candidates. If duplicates are determined in predicted values, the duplicates can be removed. Accordingly, a possibility of prediction indices can also be reduced. If a fixed prediction index is always selected, then the prediction index may not be coded. If the prediction index is not fixed and is selected among more than one predication candidates, the predication index can be coded. Prediction index can be coded by a fixed length coding, a variable length coding, a differential coding, or the like.

In an embodiment, a prediction residue R of the position value (or prediction value) can be coded (or determined). The prediction residue R can indicate a difference between a prediction value of a current vertex and the current vertex. The prediction residue R can be coded by a fixed length coding, an exponential-Golomb coding, an arithmetic coding, or the like. Thus, the decoder can reconstruct the current vertex based on the prediction value and the prediction residue, where the prediction value can be determined based on the decoded prediction index form the prediction list.

Figure 7:
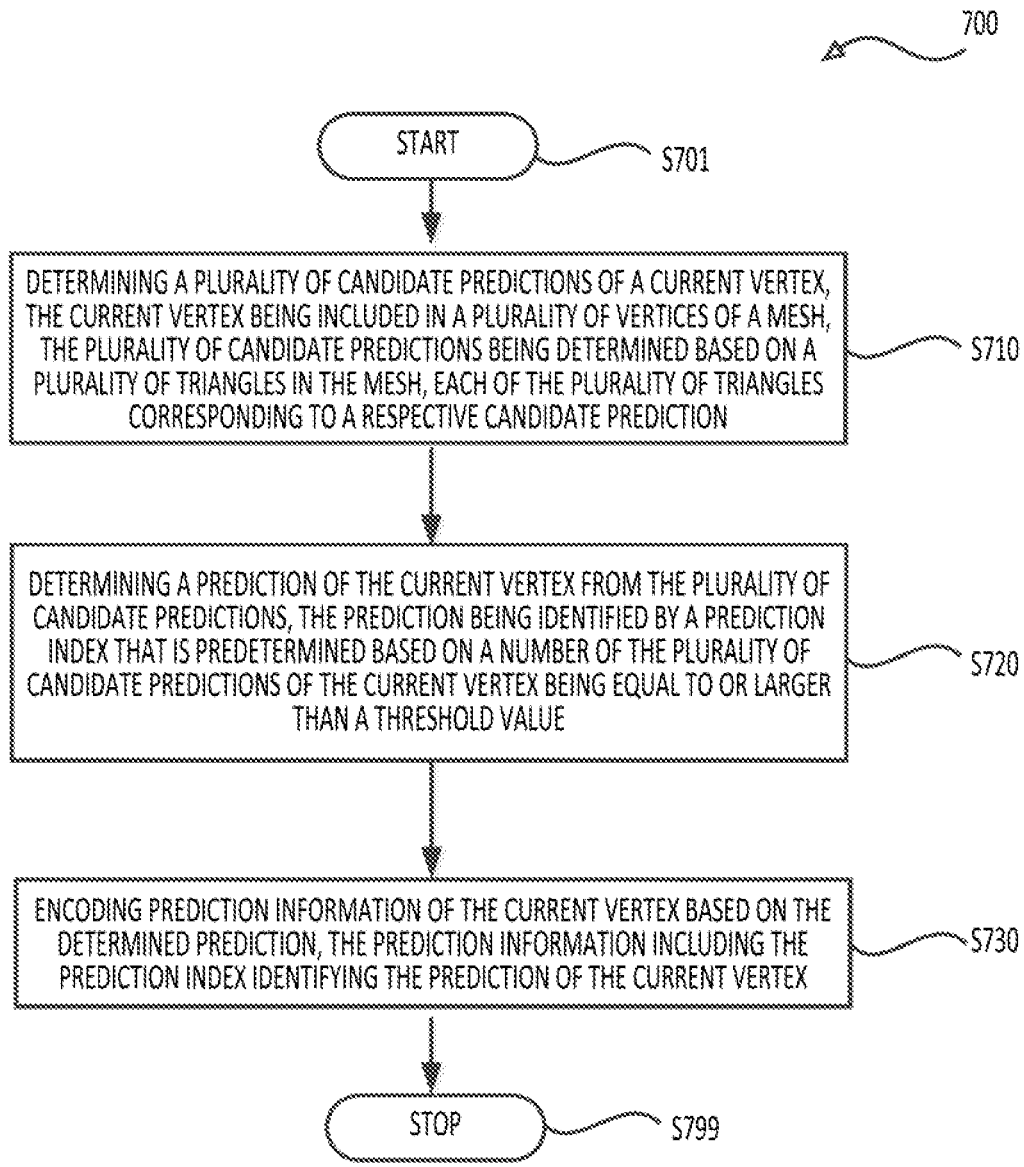
FIG. 7 shows a flow chart outlining a process according to some embodiments of the disclosure.

FIG. 7 shows a flow chart outlining a process (700) according to an embodiment of the disclosure. The process (700) can be used in an encoder, such as a video encoder. In various embodiments, the process (700) is executed by processing circuitry, such as the processing circuitry that performs functions of the video encoder (103), the processing circuitry that performs functions of the video encoder (303), and the like. In some embodiments, the process (700) is implemented in software instructions, thus when the processing circuitry executes the software instructions, the processing circuitry performs the process (700). The process starts at (S701) and proceeds to (S710).

At step (S710), a plurality of candidate predictions of a current vertex is determined. The current vertex is included in a plurality of vertices of a mesh. The plurality of candidate predictions is determined based on a plurality of triangles. Each of the plurality of triangles corresponds to a respective candidate prediction.

At step (S720), a prediction of the current vertex is determined from the plurality of candidate predictions. The prediction is identified by a prediction index that is predetermined based on a number of the plurality of candidate predictions of the current vertex being equal to or larger than a threshold value.

At step (S730), prediction information of the current vertex is encoded based on the determined prediction. The prediction information includes the prediction index identifying the prediction of the current vertex.

In some embodiments, the threshold value is equal to or larger than 2 and equal to or smaller than 5.

In an example, to determine the plurality of candidate predictions of the current vertex, a first triangle of the plurality of triangles is determined for the current vertex, where the first triangle shares an edge with a second triangle of the plurality of triangles. The current vertex is included in the second triangle and opposite to the shared edge. A first candidate prediction of the plurality of candidate predictions is determined based on the determined first triangle via a parallelogram prediction in which the first candidate prediction and the first triangle form a first parallelogram.

In an example, to determine the plurality of candidate predictions of the current vertex, an average prediction of the plurality of candidate predictions is determined.

In an example, to determine the prediction of the current vertex, a prediction list is determined for the current vertex. Candidate predictors of the prediction list include the average prediction and the plurality of candidate predictions subsequent to the average prediction in the prediction list. An order of the plurality of candidate predictions in the prediction list is based on an order of the plurality of triangles corresponding to the plurality of candidate predictions. Each of the candidate predictors in the prediction list is associated with a respective prediction index.

In some embodiments, the plurality of triangles is ordered based on an Edgebreaker algorithm in which the plurality of triangles is labelled in a spiraling triangle-spanning-tree order.

In an example, based on the prediction index being predetermined as a first prediction index in response to the number of the plurality of candidate predictions of the current vertex being equal to the threshold value, the prediction of the current vertex is determined as a first one of the candidate predictors in the prediction list according to the predetermined prediction index. In an example, based on the prediction index being predetermined as a second prediction index in response to the number of the plurality of candidate predictions of the current vertex being larger than the threshold value, the prediction of the current vertex is determined as a second one of the candidate predictors in the prediction list according to the predetermined prediction index. In an example, based on the prediction index being predetermined as a third prediction index in response to the number of the plurality of candidate predictions of the current vertex being equal to or larger than the threshold value, the prediction of the current vertex is determined as a third one of the candidate predictors in the prediction list according to the predetermined prediction index.

In an example, to determine the prediction of the current vertex, a prediction difference between each of the candidate predictors in the prediction list and the current vertex is determined. The prediction is further determined from the candidate predictors in the prediction list that corresponds to a minimum prediction difference of the prediction differences.

In an example, to determine the prediction of the current vertex, the prediction is determined in a subset of the candidate predictors of the prediction list that has a minimum prediction difference.

In some embodiments, the respective prediction index is determined for each of the candidate predictors in the prediction list based on one of a fixed length coding, a variable length coding, and a differential coding.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
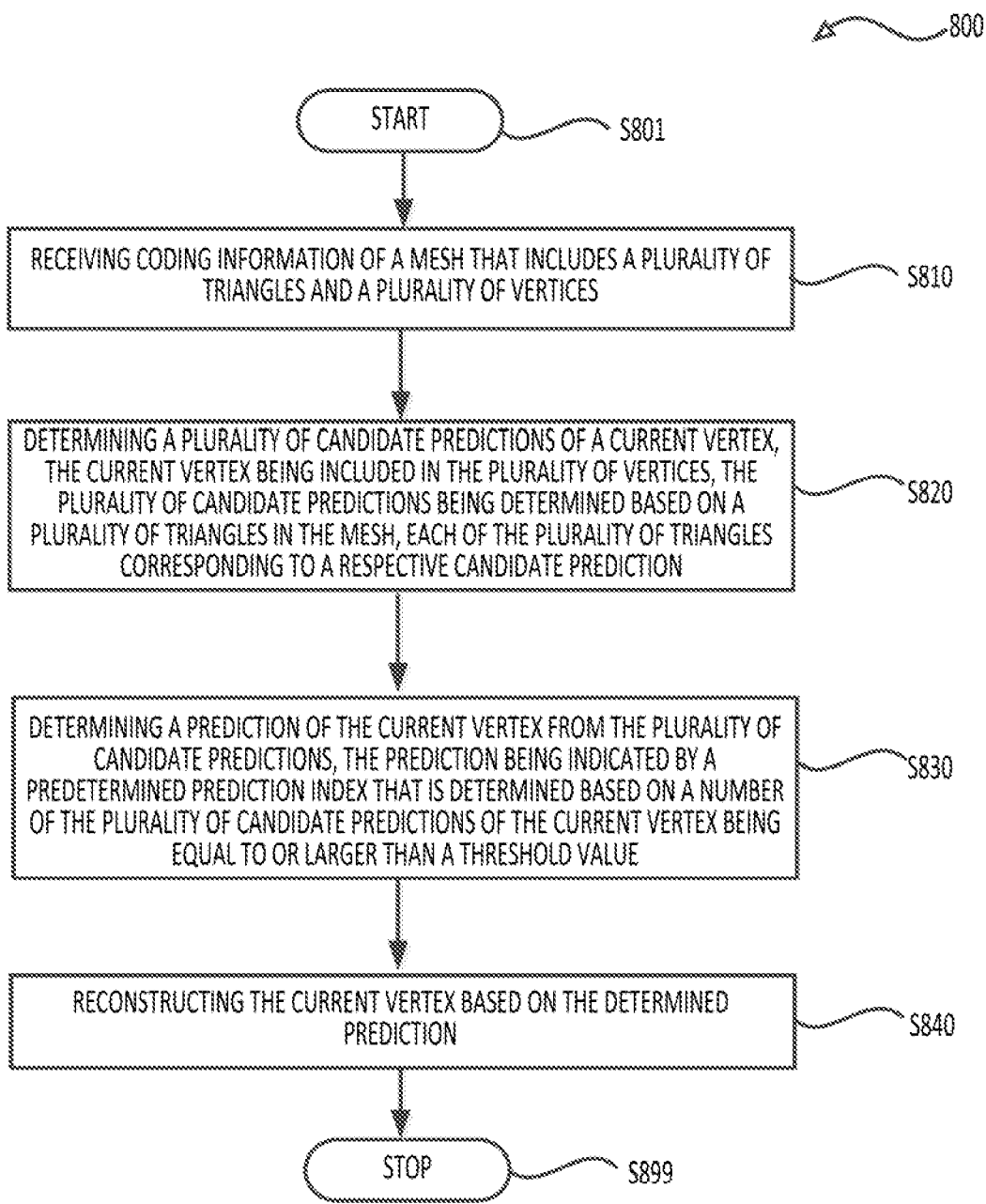
FIG. 8 shows a flow chart outlining another process according to some embodiments of the disclosure.

FIG. 8 shows a flow chart outlining a process (800) according to an embodiment of the disclosure. The process (800) can be used in a decoder, such as a video decoder. In various embodiments, the process (800) is executed by processing circuitry, such as the processing circuitry that performs functions of the video decoder (110), the processing circuitry that performs functions of the video decoder (210), and the like. In some embodiments, the process (800) is implemented in software instructions, thus when the processing circuitry executes the software instructions, the processing circuitry performs the process (800). The process starts at (S801) and proceeds to (S810).

At step (S810), coding information of a mesh that includes a plurality of triangles and a plurality of vertices is received.

At step (S820), a plurality of candidate predictions of a current vertex is determined. The current vertex is included in a plurality of vertices of a mesh. The plurality of candidate predictions is determined based on a plurality of triangles, where each of the plurality of triangles corresponds to a respective candidate prediction.

At step (S830), a prediction of the current vertex is determined from the plurality of candidate predictions. The prediction is indicated by a predetermined prediction index that is determined based on a number of the plurality of candidate predictions of the current vertex being equal to or larger than a threshold value.

At step (S840), the current vertex is reconstructed based on the determined prediction.

Then, the process proceeds to (S899) and terminates.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media, such as a non-transitory computer-readable storage medium. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by processing circuitry such as one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
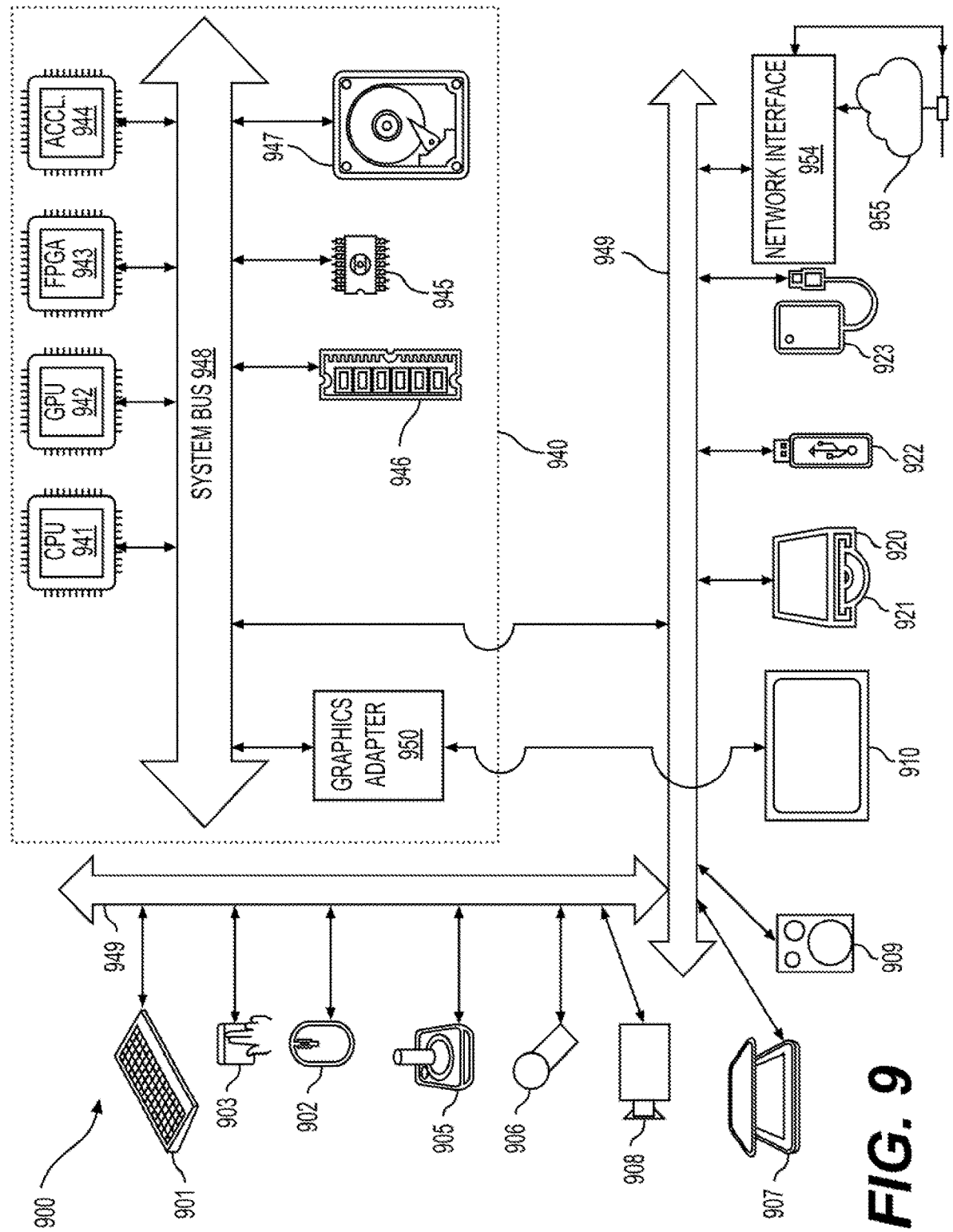
FIG. 9 is a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid-state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900));

others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing performed in a video encoder, the method comprising:
   determining a plurality of candidate predictions of a current vertex, the current vertex being included in a plurality of vertices of a mesh, the plurality of candidate predictions being determined based on a plurality of triangles in the mesh, each of the plurality of triangles corresponding to a respective candidate prediction;
   determining a prediction of the current vertex based on the plurality of candidate predictions, the prediction being identified by a prediction index that is predetermined based on a number of the plurality of candidate predictions of the current vertex being equal to or larger than a threshold value; and
   encoding prediction information of the current vertex based on the determined prediction, the prediction information including the prediction index identifying the prediction of the current vertex, wherein:
   the prediction index is encoded as a first prediction index when the number of the plurality of candidate predictions of the current vertex is equal to the threshold value, the first prediction index indicating the prediction of the current vertex is associated with a first one of a plurality of candidate predictors in a prediction list, and
   the prediction index is encoded as a second prediction index when the number of the plurality of candidate predictions of the current vertex is larger than the threshold value, the second prediction index indicating the prediction of the current vertex is associated with a second one of the plurality of candidate predictors in the prediction list.

2. The method of claim 1, wherein the threshold value is equal to or larger than 2 and equal to or smaller than 5.

3. The method of claim 1, wherein the determining the plurality of candidate predictions of the current vertex further comprises:
   determining a first triangle of the plurality of triangles for the current vertex, the first triangle sharing an edge with a second triangle of the plurality of triangles, the current vertex being included in the second triangle and opposite to the shared edge; and determining a first candidate prediction of the plurality of candidate predictions based on the determined first triangle via a parallelogram prediction in which the first candidate prediction and the first triangle form a first parallelogram.

4. The method of claim 3, wherein the determining the plurality of candidate predictions of the current vertex further comprises:

determining an average prediction of the plurality of candidate predictions.

5. The method of claim 4, wherein the determining the prediction of the current vertex further comprises:

determining the prediction list for the current vertex, the prediction list including the average prediction and the plurality of candidate predictions subsequent to the average prediction in the prediction list, an order of the plurality of candidate predictions in the prediction list being based on an order of the plurality of triangles in the mesh, and each of the plurality of candidate predictors in the prediction list being associated with a respective prediction index.

6. The method of claim 5, wherein the plurality of triangles is ordered based on an Edgebreaker algorithm in which the plurality of triangles is labelled in a spiraling triangle-spanning-tree order.

7. The method of claim 1, wherein:

the prediction index is encoded as a third prediction index when the number of the plurality of candidate predictions of the current vertex is equal to or larger than the threshold value, the third prediction index indicating that the prediction of the current vertex is associated with a third one of the plurality of candidate predictors in the prediction list.

8. The method of claim 5, wherein the determining the prediction of the current vertex further comprises:

determining a prediction difference between each of the plurality of candidate predictors in the prediction list and the current vertex; and determining the prediction from the plurality of candidate predictors in the prediction list that corresponds to a minimum prediction difference of the prediction differences.

9. The method of claim 5, wherein the determining the prediction of the current vertex further comprises:

determining the prediction in a subset of the plurality of candidate predictors of the prediction list that has a minimum prediction difference.

10. The method of claim 5, wherein the determining the respective prediction index further comprises:

determining the respective prediction index for each of the plurality of candidate predictors in the prediction list based on one of a fixed length coding, a variable length coding, and a differential coding.

11. The method of claim 1, wherein:

the prediction information of the current vertex includes residual information indicating a difference between the current vertex and the determined prediction, and the method further comprising:

encoding the residual information.

12. A method of mesh processing performed in a video decoder, the method comprising:

receiving a bitstream including coded information of a mesh including a plurality of vertices, the coded information including a prediction index that identifies a prediction of a current vertex;

determining a plurality of candidate predictions of the current vertex of the mesh, the plurality of candidate predictions being determined based on a plurality of triangles in the mesh, each of the plurality of triangles corresponding to a respective candidate prediction;

determining the prediction of the current vertex from a plurality of candidate predictors in a prediction list that is associated with the plurality of candidate predictions, the prediction being identified by the prediction index that is predetermined based on a number of the plurality of candidate predictions of the current vertex being equal to or larger than a threshold value; and reconstructing the current vertex based on the determined prediction, wherein:

when the number of the plurality of candidate predictions of the current vertex is equal to the threshold value, the prediction index is a first prediction index and the prediction of the current vertex is determined with a first one of the plurality of candidate predictors in the prediction list according to the first prediction index, and when the number of the plurality of candidate predictions of the current vertex is larger than the threshold value, the prediction index is a second prediction index and the prediction of the current vertex is determined with a second one of the plurality of candidate predictors in the prediction list according to the second prediction index.

13. The method of claim 12, wherein the threshold value is equal to or larger than 2 and equal to or smaller than 5.

14. The method of claim 12, wherein the determining the plurality of candidate predictions of the current vertex further comprises:

determining a first triangle of the plurality of triangles for the current vertex, the first triangle sharing an edge with a second triangle of the plurality of triangles, the current vertex being included in the second triangle and opposite to the shared edge; and determining a first candidate prediction of the plurality of candidate predictions based on the determined first triangle via a parallelogram prediction in which the first candidate prediction and the first triangle form a first parallelogram.

15. The method of claim 14, wherein the determining the plurality of candidate predictions of the current vertex further comprises:

determining an average prediction of the plurality of candidate predictions.

16. The method of claim 15, wherein the determining the prediction of the current vertex further comprises:

determining the prediction list for the current vertex, the prediction list including the average prediction and the plurality of candidate predictions subsequent to the average prediction in the prediction list, an order of the plurality of candidate predictions in the prediction list being based on an order of the plurality of triangles in the mesh, and each of the plurality of candidate predictors in the prediction list being associated with a respective prediction index.

17. The method of claim 16, wherein the plurality of triangles is ordered based on an Edgebreaker algorithm in which the plurality of triangles is labelled in a spiraling triangle-spanning-tree order.

18. The method of claim 12, wherein:

when the number of the plurality of candidate predictions of the current vertex is equal to or larger than the threshold value, the prediction index is a third prediction index and the prediction of the current vertex is determined with a third one of the plurality of candidate predictors in the prediction list according to the third prediction index.

19. The method of claim 16, wherein the determining the prediction of the current vertex further comprises:

determining a prediction difference between each of the plurality of candidate predictors in the prediction list and the current vertex; and determining the prediction from the plurality of candidate predictors in the prediction list that corresponds to a minimum prediction difference of the prediction differences.

20. A method of processing mesh data, the method comprising:

processing a bitstream of the mesh data according to a format rule, wherein:

the bitstream includes coded information of a mesh with a plurality of vertices, the coded information including a prediction index that identifies a prediction of a current vertex of the mesh; and the format rule specifies that:

a plurality of candidate predictions is determined for the current vertex of the mesh, the plurality of candidate predictions being determined based on a plurality of triangles in the mesh, each of the plurality of triangles corresponding to a respective candidate prediction;

the prediction of the current vertex is determined from a plurality of candidate predictors in a prediction list that is associated with the plurality of candidate predictions, the prediction being identified by the prediction index that is predetermined based on a number of the plurality of candidate predictions of the current vertex being equal to or larger than a threshold value; and the current vertex is processed based on the determined prediction, wherein:

when the number of the plurality of candidate predictions of the current vertex is equal to the threshold value, the prediction index is a first prediction index and the prediction of the current vertex is determined with a first one of the plurality of candidate predictors in the prediction list according to the first prediction index, and when the number of the plurality of candidate predictions of the current vertex is larger than the threshold value, the prediction index is a second prediction index and the prediction of the current vertex is determined with a second one of the plurality of candidate predictors in the prediction list according to the second prediction index.

* * * * *